(12) United States Patent
Schafer et al.

(10) Patent No.: US 9,835,343 B2
(45) Date of Patent: Dec. 5, 2017

(54) STADIUM AMBIENT TEMPERATURE CONTROL SYSTEM

(71) Applicant: Henderson Engineers, Inc., Lenexa, KS (US)

(72) Inventors: Dustin W. Schafer, Leawood, KS (US); Phillip G. Miller, Overland Park, KS (US)

(73) Assignee: Henderson Engineers, Inc., Lenexa, KS (US)

( * ) Notice: Subject to any disclaimer, the term of this patent is extended or adjusted under 35 U.S.C. 154(b) by 0 days.

(21) Appl. No.: 15/197,257

(22) Filed: Jun. 29, 2016

(65) Prior Publication Data

US 2017/0003042 A1  Jan. 5, 2017

Related U.S. Application Data

(60) Provisional application No. 62/187,004, filed on Jun. 30, 2015.

(51) Int. Cl.
*F24F 5/00* (2006.01)
*A47C 1/12* (2006.01)
(Continued)

(52) U.S. Cl.
CPC ............... *F24F 5/0021* (2013.01); *A47C 1/12* (2013.01); *A47C 7/744* (2013.01); *E04H 3/12* (2013.01);
(Continued)

(58) Field of Classification Search
CPC ......... F24F 5/0021; F24F 5/0007; A47C 1/12; A47C 7/744; A47C 7/74; E04H 3/12
See application file for complete search history.

(56) References Cited

U.S. PATENT DOCUMENTS

| | | |
|---|---|---|
| 2,820,593 A | 1/1958 | Goodbar |
| 4,495,723 A | 1/1985 | Wasserman |

(Continued)

FOREIGN PATENT DOCUMENTS

| | | |
|---|---|---|
| WO | 0135511 | 5/2001 |
| WO | 2011162448 | 12/2011 |

OTHER PUBLICATIONS

"International Search Report & Written Opinion; PCT/US2016/040502, dated Sep. 22, 2016".

(Continued)

*Primary Examiner* — Beth Stephan
(74) *Attorney, Agent, or Firm* — Law Office of Mark Brown, LLC; Christopher M. DeBacker

(57) ABSTRACT

A system for controlling ambient temperatures of exposed structures using phase change materials and/or tempered liquid delivery systems. Phase change materials may be fabricated to hold the surrounding temperature at a desired temperature, such as 70 degrees Fahrenheit/21 degrees Celsius. As the heat load rises above this desired temperature, the heat is absorbed into the phase change material until that material has completely transitioned through its phase change, after which it will no longer absorb heat load. As the temperature then cools off at night, the heat is released from the phase change material, and the material changes back into its original phase. Phase change material may be placed within or on the exterior of stadium chairs. A liquid piping system may also be used to provide ambient heat control, including liquid piping for piping temperature-controlled liquid throughout the stadium while preventing condensation.

6 Claims, 10 Drawing Sheets

(51) Int. Cl.
*A47C 7/74* (2006.01)
*E04H 3/12* (2006.01)
*F24F 11/00* (2006.01)
*F24F 13/22* (2006.01)

(52) U.S. Cl.
CPC .... *F24F 5/0007* (2013.01); *F24F 2005/0032* (2013.01); *F24F 2011/0013* (2013.01); *F24F 2011/0058* (2013.01); *F24F 2013/221* (2013.01); *F24F 2221/08* (2013.01); *F24F 2221/10* (2013.01); *Y02E 60/147* (2013.01)

(56) References Cited

U.S. PATENT DOCUMENTS

| | | | |
|---|---|---|---|
| 4,790,594 A * | 12/1988 | Temos | A47C 1/12 29/464 |
| 4,989,915 A * | 2/1991 | Hansal | A47C 7/407 297/17 |
| 5,423,996 A | 6/1995 | Salyer | |
| 5,552,075 A | 9/1996 | Salyer | |
| 5,575,812 A | 11/1996 | Owens | |
| 5,613,730 A | 3/1997 | Buie et al. | |
| 5,617,811 A | 4/1997 | Johnson | |
| 5,626,936 A | 5/1997 | Alderman | |
| 5,650,090 A | 7/1997 | Salyer | |
| 5,750,962 A | 5/1998 | Hyatt | |
| 6,108,489 A | 8/2000 | Frohlich et al. | |
| 6,148,634 A | 11/2000 | Sherwood | |
| 6,220,659 B1 * | 4/2001 | McDowell | A47C 1/12 219/217 |
| 6,657,170 B2 | 12/2003 | Clothier | |
| 6,774,346 B2 | 8/2004 | Clothier | |
| 7,222,659 B2 | 5/2007 | Levin | |
| 7,950,739 B2 * | 5/2011 | King | A47C 1/121 297/248 |
| 8,387,315 B2 | 3/2013 | Hosking et al. | |
| 8,484,986 B2 | 7/2013 | Waibel | |
| 8,555,557 B2 | 10/2013 | Hosking et al. | |
| 8,556,337 B1 | 10/2013 | Cornities-Cary | |
| 8,881,480 B1 | 11/2014 | Horwath | |
| 9,435,554 B2 * | 9/2016 | Cothren | F24F 5/0096 |
| 2002/0086204 A1 * | 7/2002 | Rock | A41D 13/0051 429/120 |
| 2003/0109908 A1 | 6/2003 | Lachenbruch et al. | |
| 2003/0189368 A1 * | 10/2003 | Fewchuk | A47B 3/08 297/332 |
| 2007/0152479 A1 * | 7/2007 | Howman | A47C 7/021 297/180.11 |
| 2008/0100101 A1 | 5/2008 | Wolas | |
| 2009/0072594 A1 * | 3/2009 | Korytowski | A47C 7/748 297/180.12 |
| 2010/0127000 A1 | 5/2010 | Horwath | |
| 2011/0100592 A1 * | 5/2011 | Johnson | F24F 1/025 165/58 |
| 2012/0131861 A1 | 5/2012 | Hosking et al. | |
| 2012/0313405 A1 * | 12/2012 | Eckman | A47C 7/748 297/180.12 |
| 2013/0205700 A1 * | 8/2013 | Sundberg | E04C 2/525 52/404.1 |
| 2013/0213070 A1 * | 8/2013 | Cothren | F24F 5/0096 62/237 |
| 2014/0319410 A1 | 10/2014 | Sawafta et al. | |
| 2014/0339460 A1 | 11/2014 | Sawafta et al. | |
| 2015/0056404 A1 | 2/2015 | Sawafta et al. | |

OTHER PUBLICATIONS

Puretemp, "Phase Change Matters", www.puretemp.com/stories/phase-change-matters-newsletter-feb-27-2015, Feb. 27, 2015, 1-5.

* cited by examiner

STADIUM AMBIENT TEMPERATURE CONTROL SYSTEM

CROSS-REFERENCE TO RELATED APPLICATION

This application claims priority in U.S. Provisional Patent Application No. 62/187,004, filed Jun. 30, 2015, which is incorporated herein by reference.

BACKGROUND OF THE INVENTION

1. Field of the Invention

The present invention relates generally to an ambient temperature control system for stadiums, and more specifically to a temperature control system for use in stadiums or other outdoor spaces using phase change materials and/or tempered liquid within seating structures or other areas of the structure.

2. Description of the Related Art

Monitoring and maintaining the temperature of buildings, especially large structures, is very difficult. The larger the building, the higher the thermal load that must be dealt with to heat or, more likely, to cool the building to a comfortable level. Most structures use air conditioning or some variation thereof to chill and blow air through the building to cool it. Other architectural methods for cooling, such as chilled beam systems, geothermal, night-sky cooling, ventilation passages, cooling "fins," and thermal energy storage may be employed in some circumstances, but their results vary and their costs may not always be economical.

For exterior spaces, such as sports stadiums, such cooling systems are even less likely to be useful. Especially in structures where there is no roof, traditional air conditioning cannot adequately cool the exterior space and does not comply with typical energy codes.

Phase change materials have been used for various applications, from food storage to crop protection to interior building materials. However, its application has not been fully explored for use in exterior locations.

What is needed is an economical and simple way to equalize temperatures for large exterior spaces, such as sports stadiums without using expensive and ineffective traditional cooling techniques.

Heretofore there has not been available a temperature control system for use in stadiums with the advantages and features of the present invention.

BRIEF SUMMARY OF THE INVENTION

The present invention generally provides a system for controlling ambient temperatures of exposed structures using phase change materials and/or tempered liquid delivery systems. Phase change materials may be fabricated to hold the surrounding temperature at a desired temperature, such as 70 degrees Fahrenheit/21 degrees Celsius. As the heat load rises above this desired temperature, the heat is absorbed into the phase change material until that material has completely transitioned through its phase change, after which it will no longer absorb heat load. As the temperature then cools off at night, the heat is released from the phase change material, and the material changes back into its original phase.

By placing the phase change material within hollow portions of stadium seats, surface mounting to the seat exterior, or mounting through the chair rails upon which stadium seats are mounted, it would be possible to minimize the extreme temperatures that occur in such large spaces and increase the comfort level of the people attending an event within the stadium. These phase change materials would cool the seating area of the stadium during hot days and would then warm the same area during cool nights. An example of how phase change materials work in general can be found at http://www.phasechange.com/index.php/en/about/how-it-works.

Alternatively, or in conjunction with the phase change materials, tempered liquids, such as tempered water, could be pumped through the mounting rails and/or the stadium seats to provide cooling. The temperature of the liquid would need to be monitored to prevent condensation from building on the seats or the rails, thus the pumping system would need a monitoring device, such as a computer, which would regulate the temperature of the liquid being pumped through the system.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

Phase change materials referred to herein could refer to any or all variations of phase change materials, including salt hydrates, petroleum, or bio-based materials.

II. Preferred Embodiment Ambient Temperature Control System 2

Stadiums are typically large exposed structures. While some stadiums include domes enclosing the entire space, cooling such large areas using conventional air conditioning means is not only difficult, but is wasteful. Most of the volume within the dome is unoccupied space over the field. The most important areas for cooling are located around the stadium seating areas or on the field itself.

Figure 1:
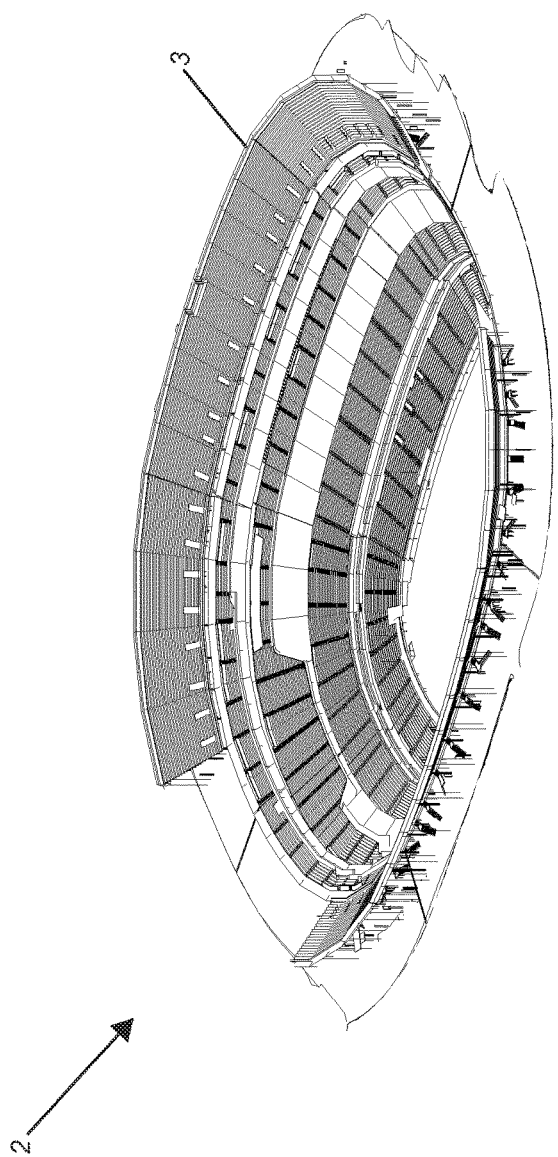
FIG. 1 is a three-dimensional view of a stadium environment deploying a preferred embodiment of the present invention.

Referring to the figures in more detail, FIG. 1 represents a stadium 3 employing an ambient temperature control system 2 utilizing the placement of many phase change material (PCM) bricks or packets throughout the stadiums structure, typically placed within or on the exterior of stadium seats and seating structures. One piece of PCM will not drastically alter the ambient temperature of any small portion of the stadium 3, but the combined effect of multiple pieces of PCM placed throughout the entire structure will provide enough of an ambient temperature break to affect the overall ambient temperature of the stadium and reduce the heating or cooling load required to heat or cool the stadium, thereby maintaining a more preferred temperature within the stadium. It should be noted that any large enclosed or exposed structure could benefit from the present invention, including theaters, gymnasiums, and other large structures.

Figure 2:
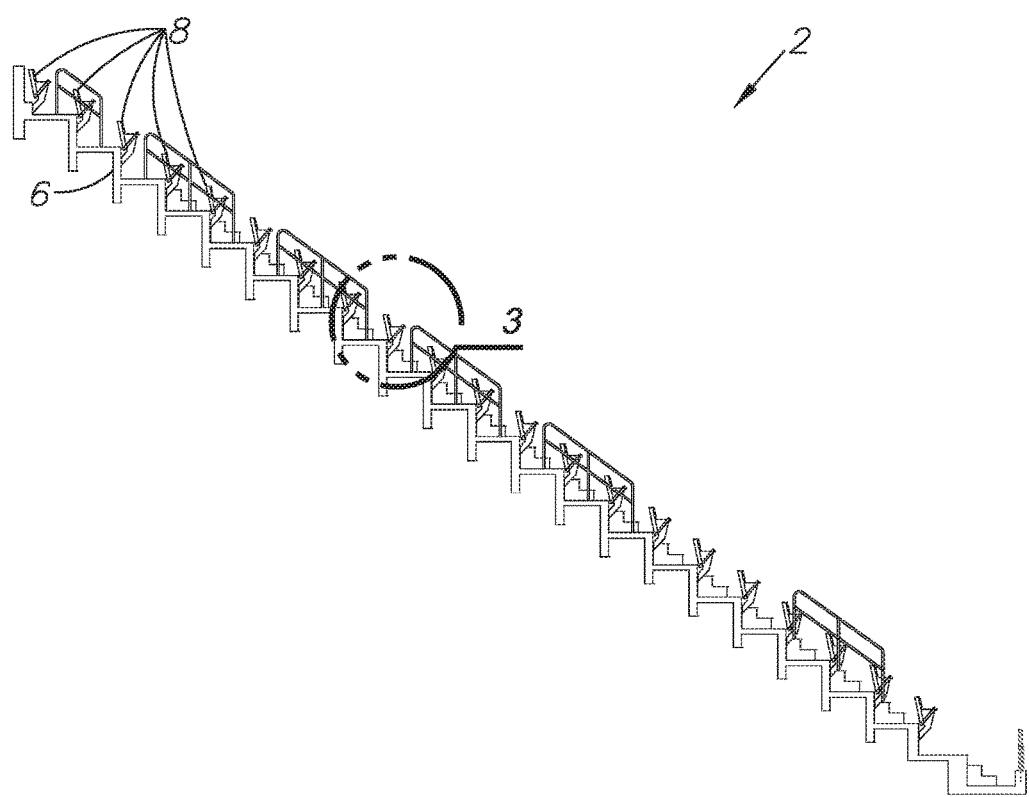
FIG. 2 is a sectional view of a portion of the stadium environment thereof deploying a preferred embodiment of the present invention.

FIG. 2 shows a section of the stadium 3 including a riser 6 and several stadium chairs 8. Each seat would include at least one piece of PCM, thereby creating a large quantity of PCM within the stadium, which will help maintain a more comfortable ambient temperature. In a preferred embodiment, PCM having melting points between 23 degrees and 27 degrees Celsius (68 degrees to 80 degrees Fahrenheit) would be used to provide maximum energy saving during peak load times.

Figure 3:
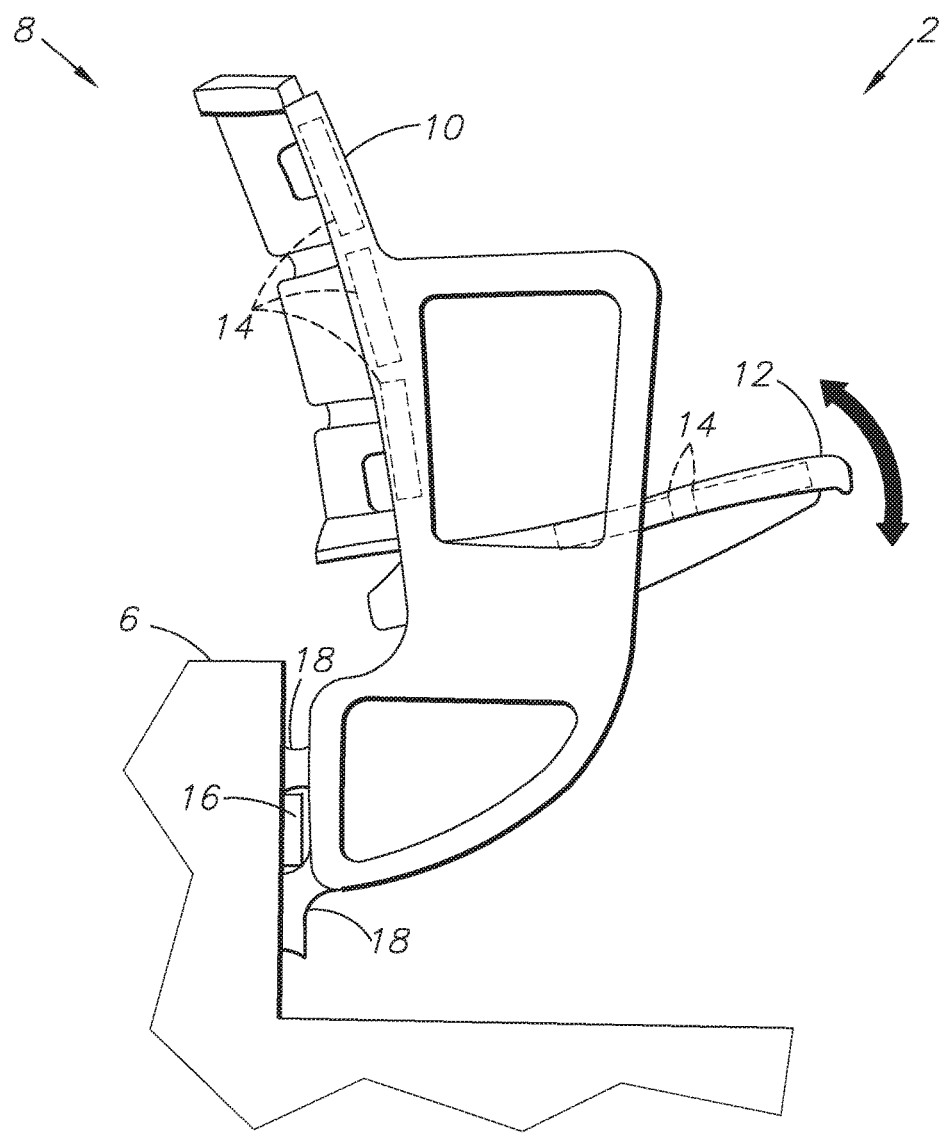
FIG. 3 is a side-elevational view of an embodiment of the present invention taken about the circle of FIG. 2 encompassing a stadium chair.

FIG. 3 is a more detailed view of a stadium chair 8 affixed to an edge of the riser 6 by a riser connector 18. The chair 8 primarily consists of a chair back 10 and a pivotable seat 12. In a preferred embodiment, these chair backs 10 and seats 12 are made of blown fiberglass or some similarly partially hollow material which allows for internal PCM packets 14 to be placed directly within the pieces of the chair itself. Additional exterior PCM packets 16 may be placed within the riser connector or other areas of the chair 8.

Figure 4:
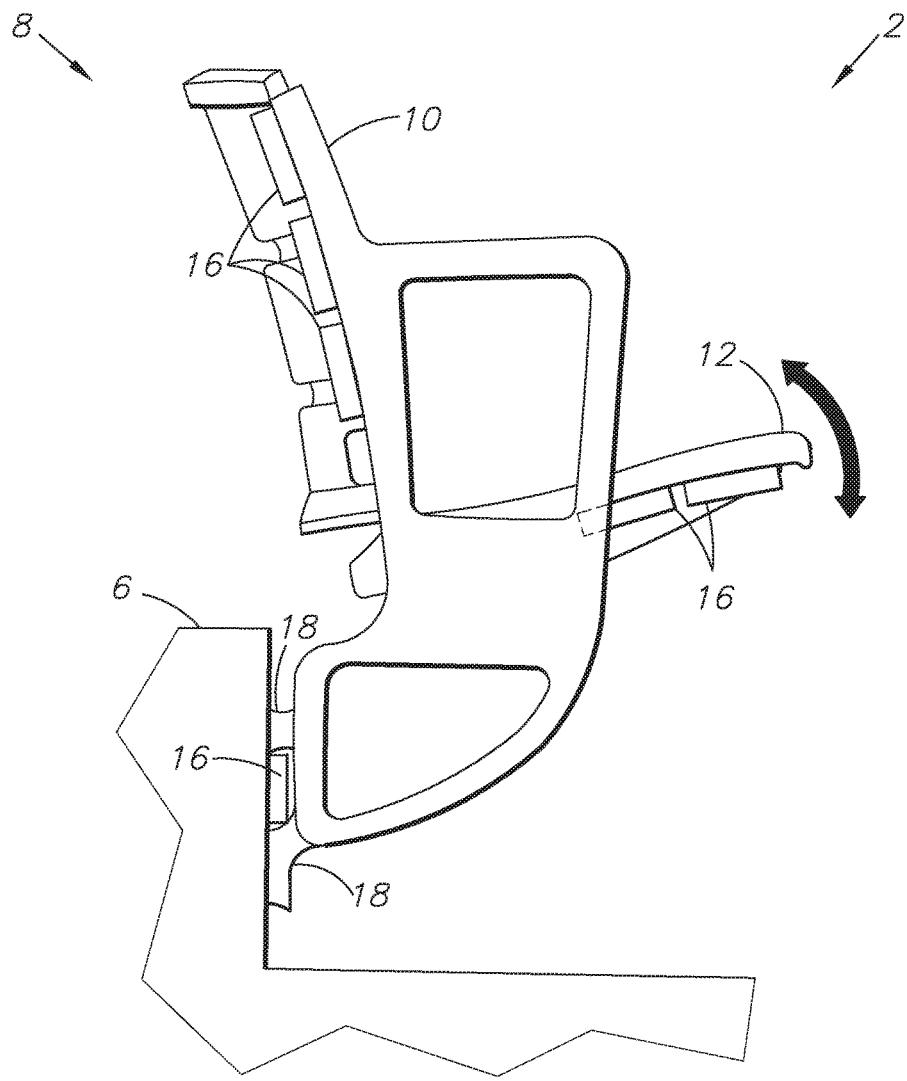
FIG. 4 is a side-elevational of an alternative embodiment thereof.

FIG. 4 shows the same chair 8 having exterior PCM packets 16 placed on the exterior of the chair back 10 and the seat 12. This would provide the same functionality of the embodiment shown in FIG. 3, but may be more open to tampering. However, this would be suitable for chairs or benches constructed from non-hollow materials such as steel or aluminum.

Figure 5:
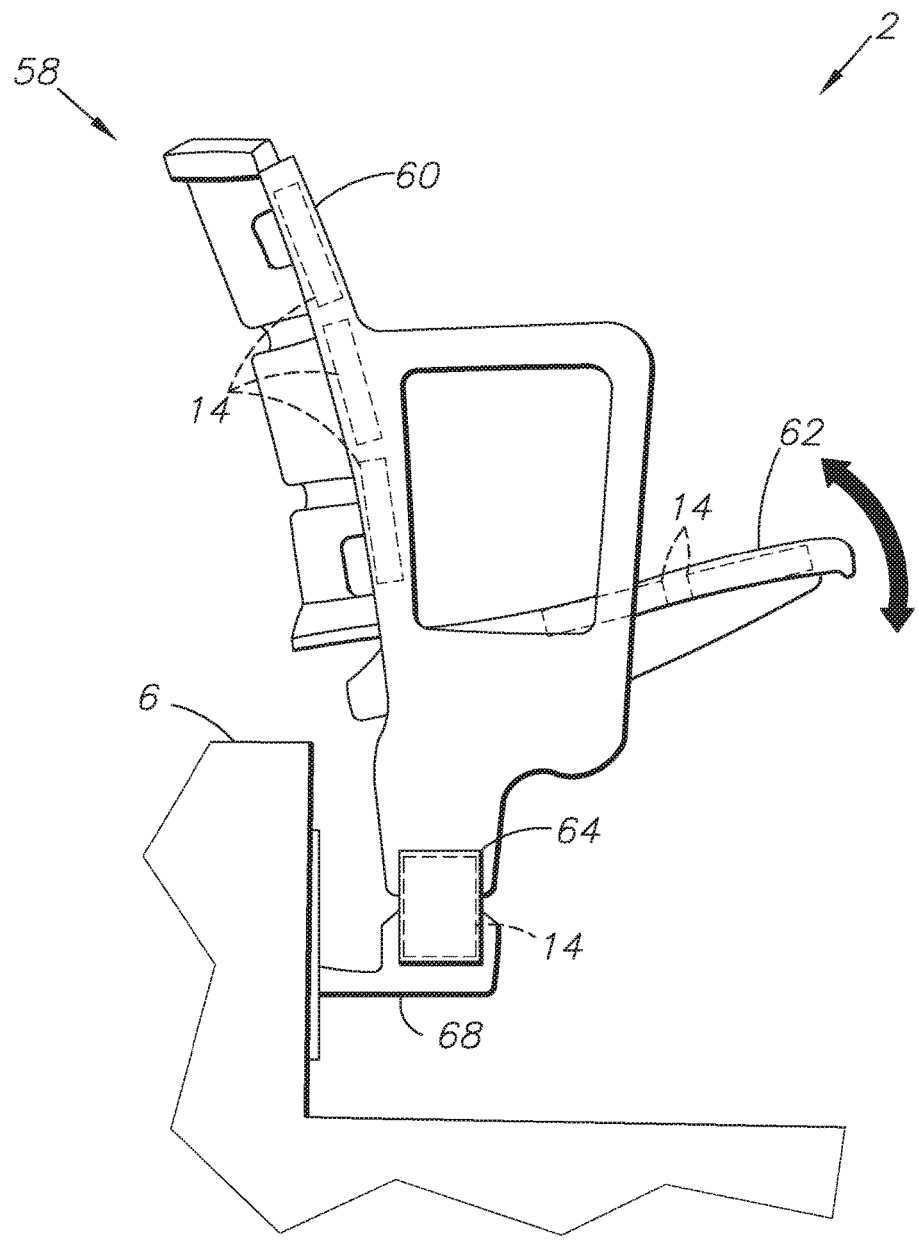
FIG. 5 is a side-elevational of a slightly modified stadium chair deploying a preferred embodiment of the present invention.
Figure 6:
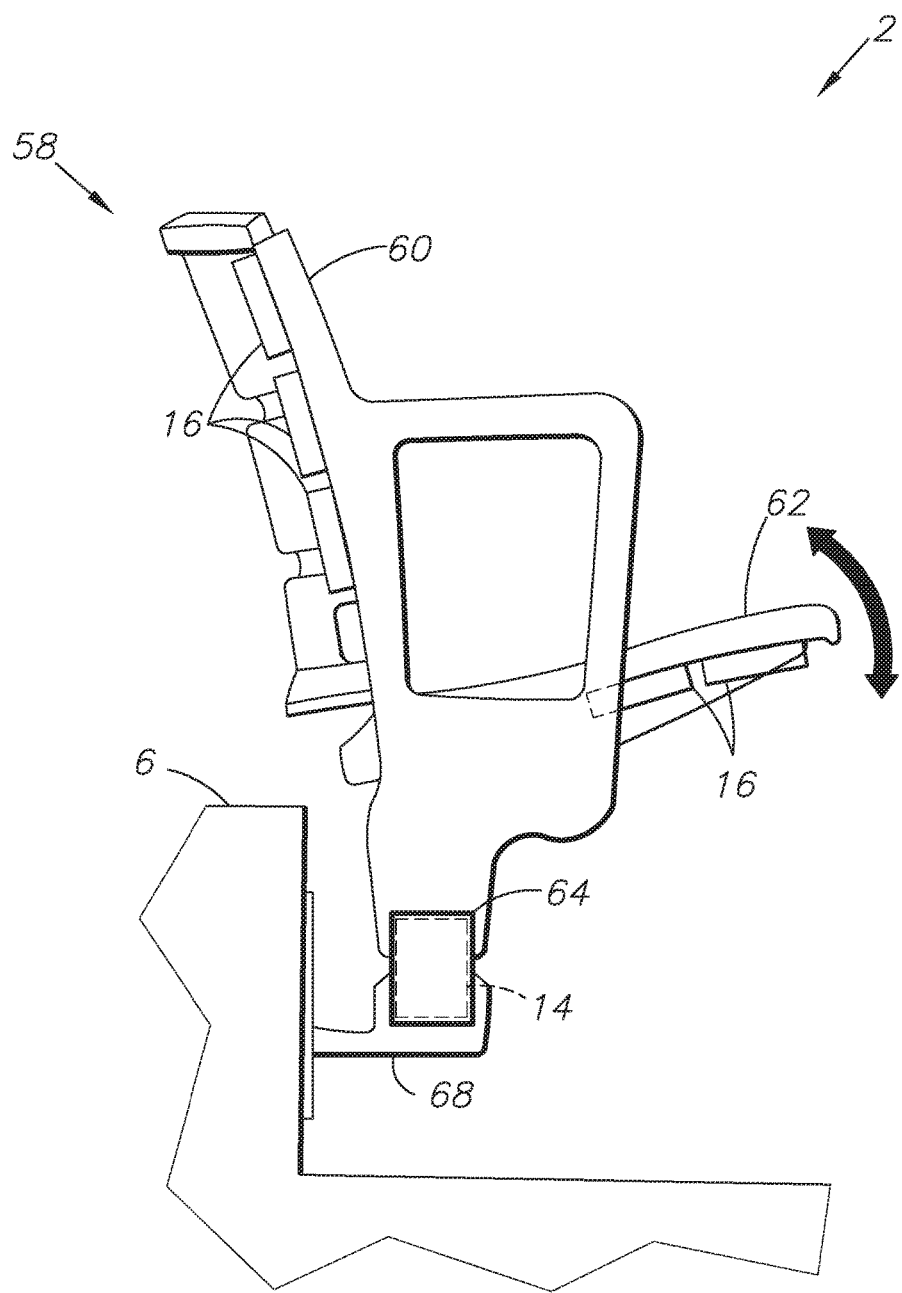
FIG. 6 is a side-elevational of an alternative embodiment thereof.

FIG. 5 shows the same PCM cooling system 2 for use with an alternative embodiment stadium chair 58 which has a chair back 60 and pivotable seat 62. Here, the chair 58 includes a chair rail 64, which is a hollow aluminum rail (or other suitable metal) which runs along the riser 6 and is connected to the riser via a rail connector 68. The chairs 58 are mounted directly to this rail. The rail can be filled with internally-mounted PCM packets 14, and the chair back and seat may also include internally-mounted PCM packets 14 as shown. Alternatively as shown in FIG. 6, external PCM packets 16 can be mounted to the chair 58 similar to the example provided above in FIG. 4.

III. Alternative Embodiment Water Cooling System 102

Figure 7:
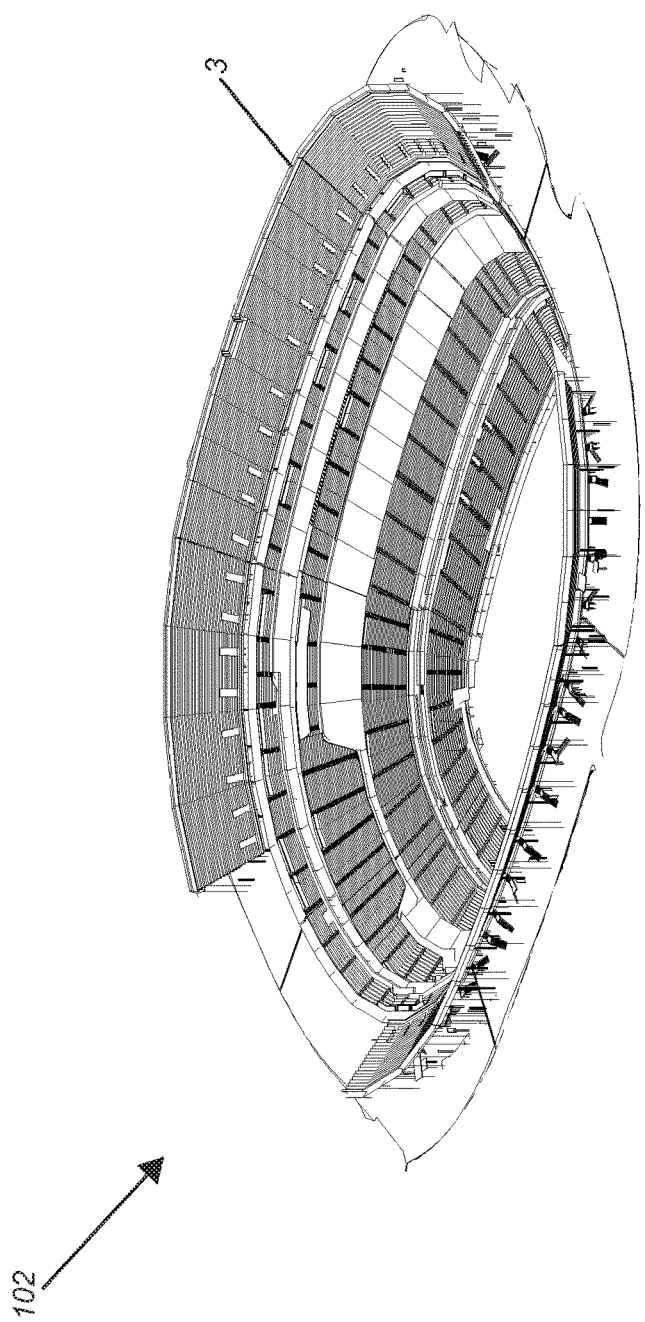
FIG. 7 is a three-dimensional view of a stadium environment deploying another alternative embodiment of the present invention.

In addition to or in combination with the PCM system discussed above and as shown in FIG. 7, tempered liquid pipes 104 may be run throughout the seating area of the stadium 3 or even under the performance area of the stadium (e.g. the field or floor) in a water cooling system 102. Tempered liquid, such as water, could be pumped through these pipes for additional temperature control. To avoid condensation, the temperature of the liquid necessarily must be closely monitored and adjusted by a temperature control system 108.

Figure 8:
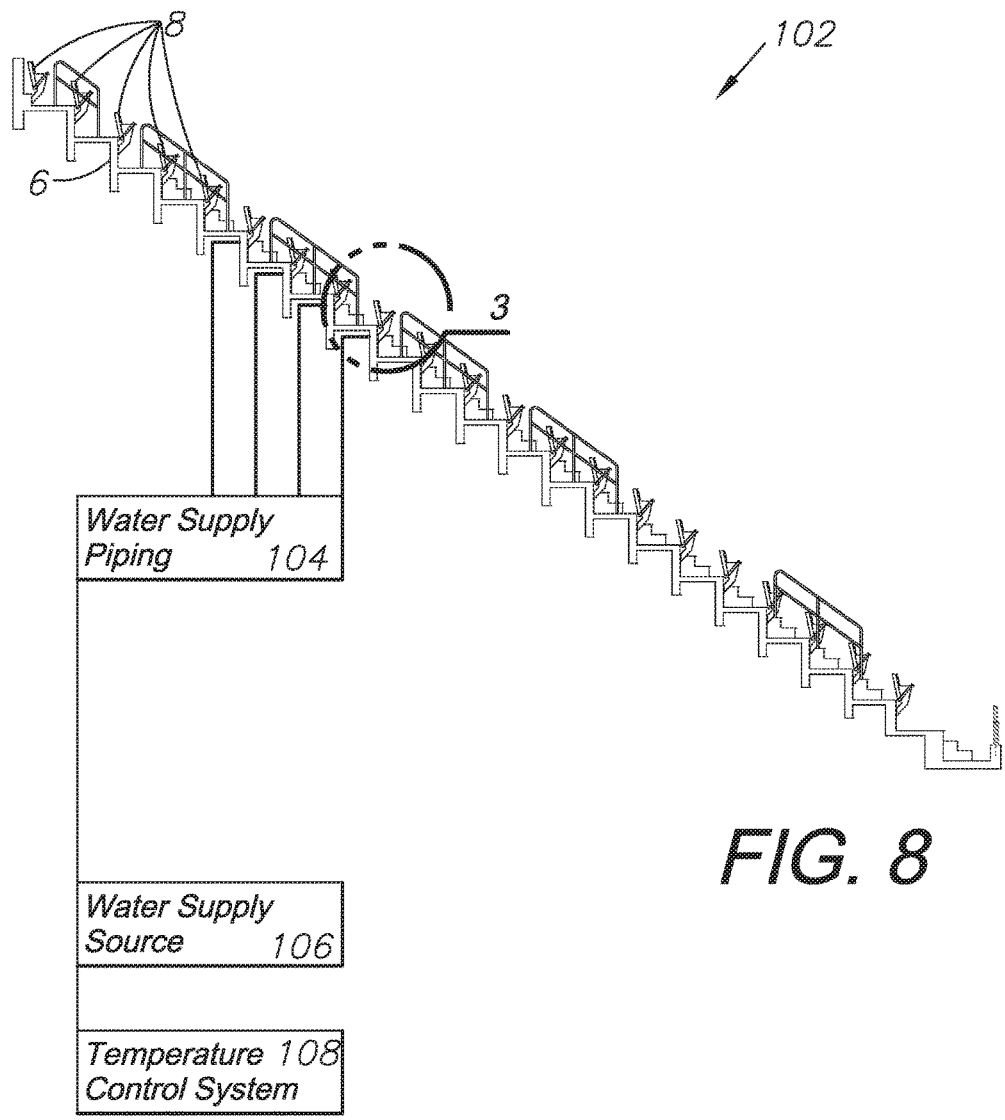
FIG. 8 is a sectional view of a portion of the stadium environment thereof deploying the alternative embodiment of the present invention.

FIG. 8 shows the same sectional view of a stadium riser 6 as shown in FIG. 2. Here, however, are included tempered liquid pipe 104 which pump liquid from a liquid (e.g. water) source 106 through the pipes. A temperature control system 108 as mentioned above is connected to the system to ensure that the liquid is an optimal temperature to prevent condensation on seats and flooring surfaces, which could cause water puddles to form and therefore cause slipping hazards. The liquid would likely run through a chiller or condenser system to produce the desired temperature. The control system 108 would likely be an automated computer system having a processor and data connection for receiving temperature data, dew point data, and other relevant data to prevent the condensation from forming.

Figure 9:
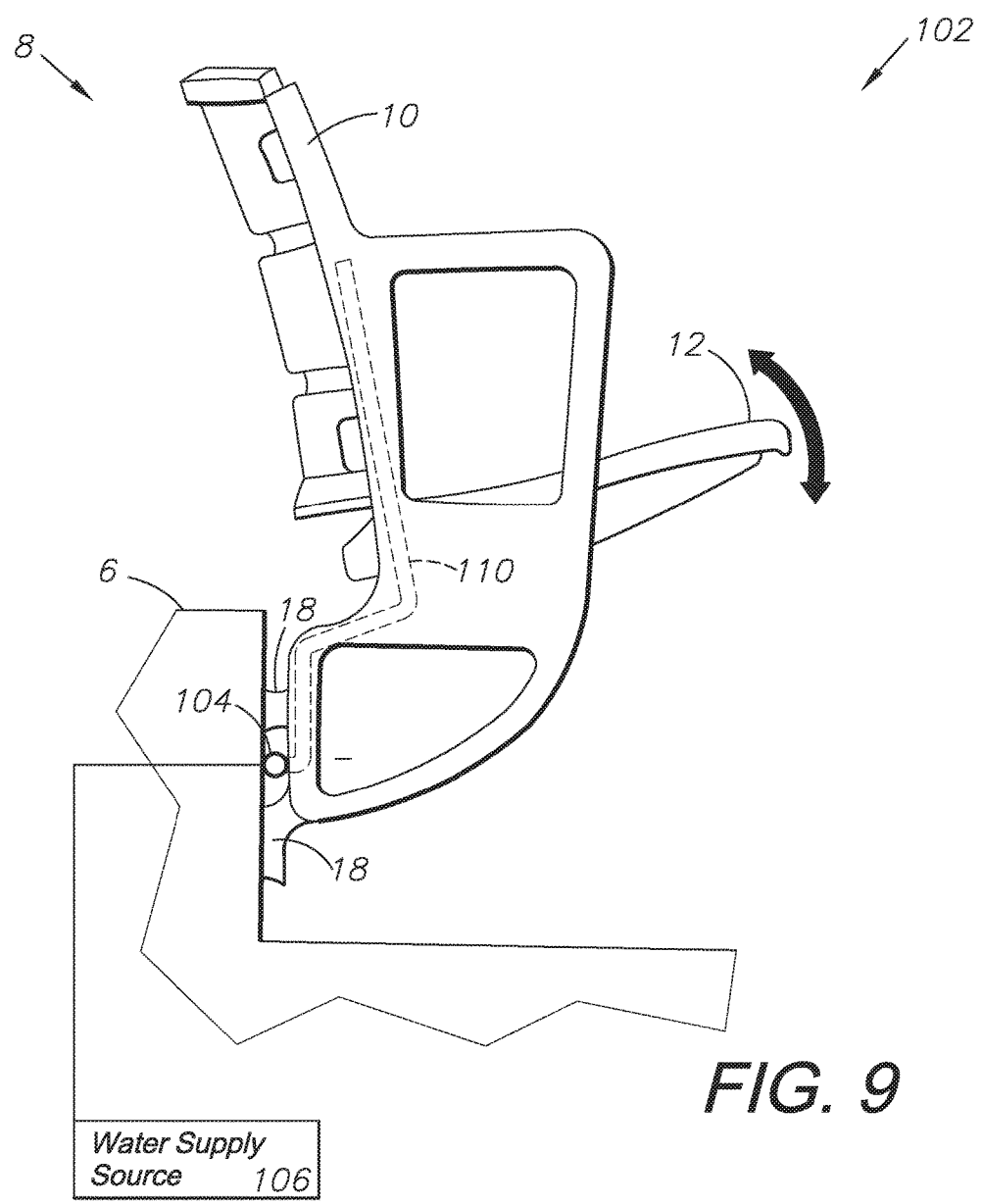
FIG. 9 is a side-elevational view of the alternative embodiment thereof taken about the circle of FIG. 8 encompassing a stadium chair.

FIG. 9 shows a close-up view of a stadium chair 8 identical to the one discussed above in reference to FIGS. 3-4, including a chair back 10 and pivotable seat 12. The piping 104 carrying the liquid would ideally be located along the vertical edge of the riser 6 as shown, and would be connected to each chair via internal tubing 110 which runs the fluid through the chair's structure. The liquid would need to cycle through the chair 8, and so it is likely a separate, return pipe would also be mounted below the supply pipe.

Figure 10:
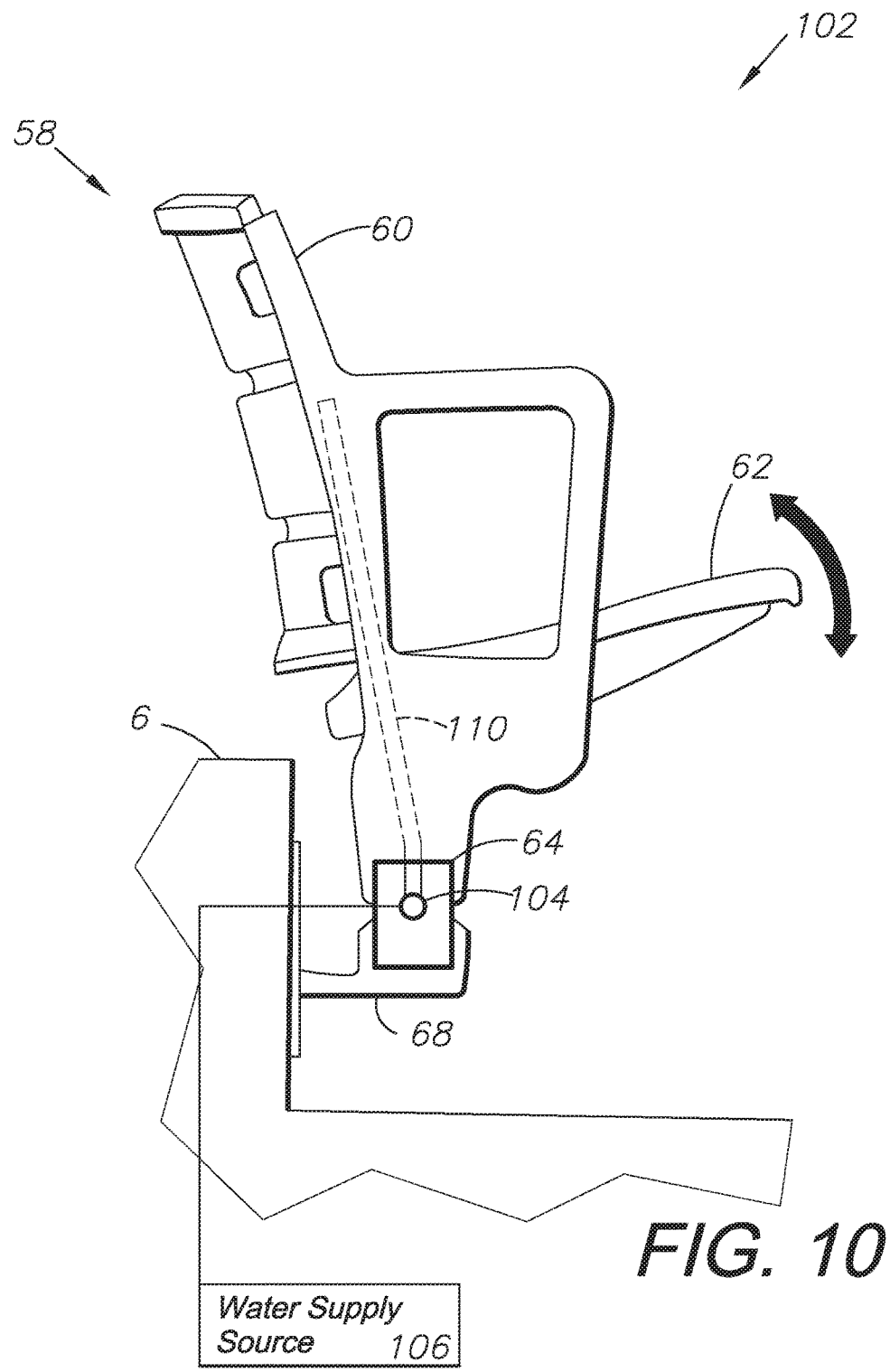
FIG. 10 is a side-elevational of a slightly modified stadium chair deploying the alternative embodiment of the present invention thereof.

Similarly, FIG. 10 shows a close-up view of a stadium chair 58 identical to the one discussed above in reference to FIGS. 5-6, including a chair back 60, pivotable seat 62, and mounting rail 64. The piping 104 would be located within the rail and connected to internal piping 110 within the chair back 60. Again, return piping may be necessary and can also be run through the rail 64.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. An exterior stadium temperature control system comprising:
   a plurality of stadium chairs located within an exterior stadium, each of said stadium chairs including a chair back and a chair seat;
   said stadium chairs being mounted in proximity with a vertical face of a stadium riser;
   a plurality of phase change material (PCM) units, wherein at least one unit of said plurality of PCM units being mounted to each of said plurality of said stadium chairs respectively, said PCM units each having a melting point between 23 degrees and 27 degrees Celsius (68 degrees to 80 degrees Fahrenheit);

whereby an ambient temperature of said stadium is thereby controlled via said plurality of PCM units;
said stadium chairs having hollow interior cavities; and
said PCM units being placed within said interior cavities.

2. The stadium temperature control system of claim 1, further comprising:
a mounting rail located along said riser, said stadium chairs being mounted to said mounting rail; and
said mounting rail including at least one of said PCM units in proximity with each respective one of said plurality of stadium chairs.

3. The stadium temperature control system of claim 1, further comprising:
a liquid reservoir and a computerized temperature controller, said controller configured to receive external temperature and weather data;
liquid piping placed in proximity with said plurality of stadium chairs, said piping connecting to internal piping located within said stadium chairs;
liquid pumped from said liquid reservoir through said liquid piping and said stadium chairs; and
wherein said temperature controller is configured to moderate a temperature of said liquid such that condensation does not appear on surfaces of said liquid piping and said stadium chairs.

4. The stadium temperature control system of claim 3, wherein said liquid is pumped through a chiller prior to being pumped through said stadium chairs thereby reducing the temperature of said liquid as controlled by said temperature controller.

5. A stadium temperature control system comprising:
a plurality of stadium chairs located within a stadium, each of said stadium chairs including a chair back and a chair seat;
said stadium chairs being mounted in proximity with a vertical face of a stadium riser;
a plurality of phase change material (PCM) units, wherein at least one unit of said plurality of PCM units being mounted to each of said plurality of said stadium chairs respectively, said PCM units each having a melting point between 23 degrees and 27 degrees Celsius (68 degrees to 80 degrees Fahrenheit);
whereby an ambient temperature of said stadium is thereby controlled via said plurality of PCM units;
a liquid reservoir and a computerized temperature controller, said controller configured to receive external temperature and weather data;
liquid piping placed in proximity with said plurality of stadium chairs, said piping connecting to internal piping located within said stadium chairs;
liquid pumped from said liquid reservoir through said liquid piping and said stadium chairs; and
wherein said temperature controller is configured to moderate a temperature of said liquid such that condensation does not appear on surfaces of said liquid piping and said stadium chairs.

6. The stadium temperature control system of claim 5, wherein said liquid is pumped through a chiller prior to being pumped through said stadium chairs thereby reducing the temperature of said liquid as controlled by said temperature controller.

* * * * *